United States Patent
Delaloye

(10) Patent No.: US 7,871,248 B2
(45) Date of Patent: Jan. 18, 2011

(54) AIRFRAME MOUNTED ELECTRIC MOTOR DRIVEN LUBRICATION PUMP CONTROL DEOIL SYSTEM

(75) Inventor: Jim E. Delaloye, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 1247 days.

(21) Appl. No.: 11/708,727

(22) Filed: Feb. 20, 2007

(65) Prior Publication Data
US 2008/0196383 A1    Aug. 21, 2008

(51) Int. Cl.
F04B 39/02   (2006.01)
F04B 39/04   (2006.01)
F02C 7/06    (2006.01)
F01D 25/18   (2006.01)

(52) U.S. Cl. .............. 417/28; 417/44.1; 417/44.11; 417/228; 417/278; 60/39.08; 184/6.11

(58) Field of Classification Search ............ 417/26, 417/28, 44.1, 44.11, 228, 278; 60/39.08; 184/6.11
See application file for complete search history.

(56) References Cited

U.S. PATENT DOCUMENTS

| | | | | |
|---|---|---|---|---|
| 2,402,467 | A * | 6/1946 | Thompson | 184/6.4 |
| 2,672,010 | A * | 3/1954 | Newcomb | 60/39.08 |
| 3,451,215 | A | 6/1969 | Bradley | |
| 3,486,582 | A | 12/1969 | Carter et al. | |
| 3,769,790 | A | 11/1973 | Thebert | |
| 4,284,174 | A * | 8/1981 | Salvana et al. | 184/6.4 |
| 4,717,000 | A * | 1/1988 | Waddington et al. | 184/6.1 |
| 4,891,934 | A | 1/1990 | Huelster | |
| 5,154,775 | A | 10/1992 | Bedi | |
| 5,433,177 | A | 7/1995 | Suzuki | |
| 5,460,656 | A | 10/1995 | Waelput et al. | |
| 5,555,722 | A * | 9/1996 | Mehr-Ayin et al. | 60/788 |
| 5,685,396 | A | 11/1997 | Elkin et al. | |
| 6,481,978 | B2 | 11/2002 | Zamalis et al. | |
| 6,536,217 | B2 * | 3/2003 | Lipinski et al. | 60/772 |
| 6,663,718 | B1 | 12/2003 | Mush | |
| 6,712,080 | B1 | 3/2004 | Handschuh et al. | |
| 6,923,190 | B1 | 8/2005 | Kavadeles et al. | |
| 7,007,452 | B1 | 3/2006 | Baryshnikov et al. | |
| 2003/0079943 | A1 | 5/2003 | Suratt | |

* cited by examiner

*Primary Examiner*—Charles G Freay
(74) *Attorney, Agent, or Firm*—Ingrassia Fisher & Lorenz, P.C.

(57) ABSTRACT

A system for controlling lubricant displacement from a machine during turbomachine shutdown sequence includes a motor, a pump, a control valve, and a motor control unit. The motor is selectively energized from a power bus to rotate at a rotational speed and supply a drive force to the pump. The pump, in response to the drive force, draws fluid from a fluid and supplies the fluid to the machine. The control valve is movable between at least a first position, in which the control valve fluidly communicates the pump with a lubrication fluid source, and a second position, in which the control valve fluidly communicates the pump with a gaseous fluid source. During the shutdown sequence, the motor control unit controllably energizes the motor from the power bus to thereby control its rotational speed in accordance with a schedule that will displace at least a substantial volume of lubricant in the rotating machine with fluid from the gaseous fluid source.

19 Claims, 1 Drawing Sheet

AIRFRAME MOUNTED ELECTRIC MOTOR DRIVEN LUBRICATION PUMP CONTROL DEOIL SYSTEM

STATEMENT REGARDING FEDERALLY SPONSORED RESEARCH OR DEVELOPMENT

This invention was made with Government support under Contract No. N00019-02-C-3002, awarded by the U.S. Navy. The Government has certain rights in this invention.

TECHNICAL FIELD

The present invention relates to rotating machine lubrication and, more particularly, to a system for controlling lubricant removal from the rotating machine during shutdown of the machine.

BACKGROUND

Many aircraft gas turbine engines are supplied with lubricant from a pump driven lubrication supply system. In particular, the lubrication supply pump, which may be part of a pump assembly having a plurality of pumps on a common, engine-driven shaft, draws lubricant from a lubricant reservoir, and increases the pressure of the lubricant. The lubricant is then delivered, via an appropriate piping circuit, to the engine. The lubricant is directed, via appropriate flow circuits within the engine, to the various components that may need lubrication, and is collected in one or more recovery sumps in the engine. One or more of the pump assembly pumps then draws the lubricant that collects in the recovery sumps and returns the lubricant back to the reservoir.

When an aircraft gas turbine engine is shutdown, the lubricant is typically removed and returned to the reservoir. In many instances this is accomplished by actuating a valve that, when appropriately positioned, allows the engine-driven pump to draw air, rather than lubricant, into the system. The pump directs the air into the engine, displacing the lubricant therefrom, and directing the displaced lubricant back to the lubricant reservoir. Because the engine is being shutdown, the inertia of the engine main rotating group supplies the rotational drive force to the engine-driven pump to provide adequate pump speed and air flow through the piping circuit to thoroughly displace the lubricant from the engine.

Although engine-driven pumps are generally reliable and robust, many lubrication supply systems are being designed and implemented with electric motor-driven pumps. Thus, instead of being mechanically driven by a gas turbine engine, the pumps are driven by electrical motors, which are energized from an electrical power bus. The electrical power bus is, in many instances, energized via an electrical machine that is driven by the engine.

Hence, there is a need for an aircraft engine lubricant supply system that includes an electric motor-driven pump that can adequately displace the lubricant in a gas turbine engine during the engine shutdown sequence. The present invention addresses at least this need.

BRIEF SUMMARY

The present invention provides for controlling lubricant removal from the rotating machine during shutdown of the machine.

In one embodiment, and by way of example only, an aircraft lubrication supply system includes a motor, a pump, a control valve, and a motor control unit. The motor is coupled to be selectively energized from a power bus and is operable, upon being energized, to rotate at a rotational speed and supply a drive force. The pump has at least a fluid inlet and a fluid outlet, is coupled to receive the drive force from the motor and is configured, in response thereto, to draw fluid from a fluid source into the fluid inlet and supply the fluid, via the fluid outlet, to a rotating machine. The control valve is coupled to the fluid inlet, and is movable between at least a first position, in which the control valve fluidly communicates the fluid inlet with a lubrication fluid source, and a second position, in which the control valve fluidly communicates the fluid inlet with an gaseous fluid source. The motor control unit is configured to couple to the power bus and to receive a machine shutdown signal indicating that the rotating machine is being shutdown. The motor control unit is operable, upon receipt of the machine shutdown signal, to controllably energize the motor from the power bus to thereby control its rotational speed in accordance with a schedule that will displace at least a substantial volume of lubricant in the rotating machine with fluid from the gaseous fluid source.

Other independent features and advantages of the preferred lubrication pump control system will become apparent from the following detailed description, taken in conjunction with the accompanying drawings which illustrate, by way of example, the principles of the invention.

DETAILED DESCRIPTION OF A PREFERRED EMBODIMENT

Figure 1:
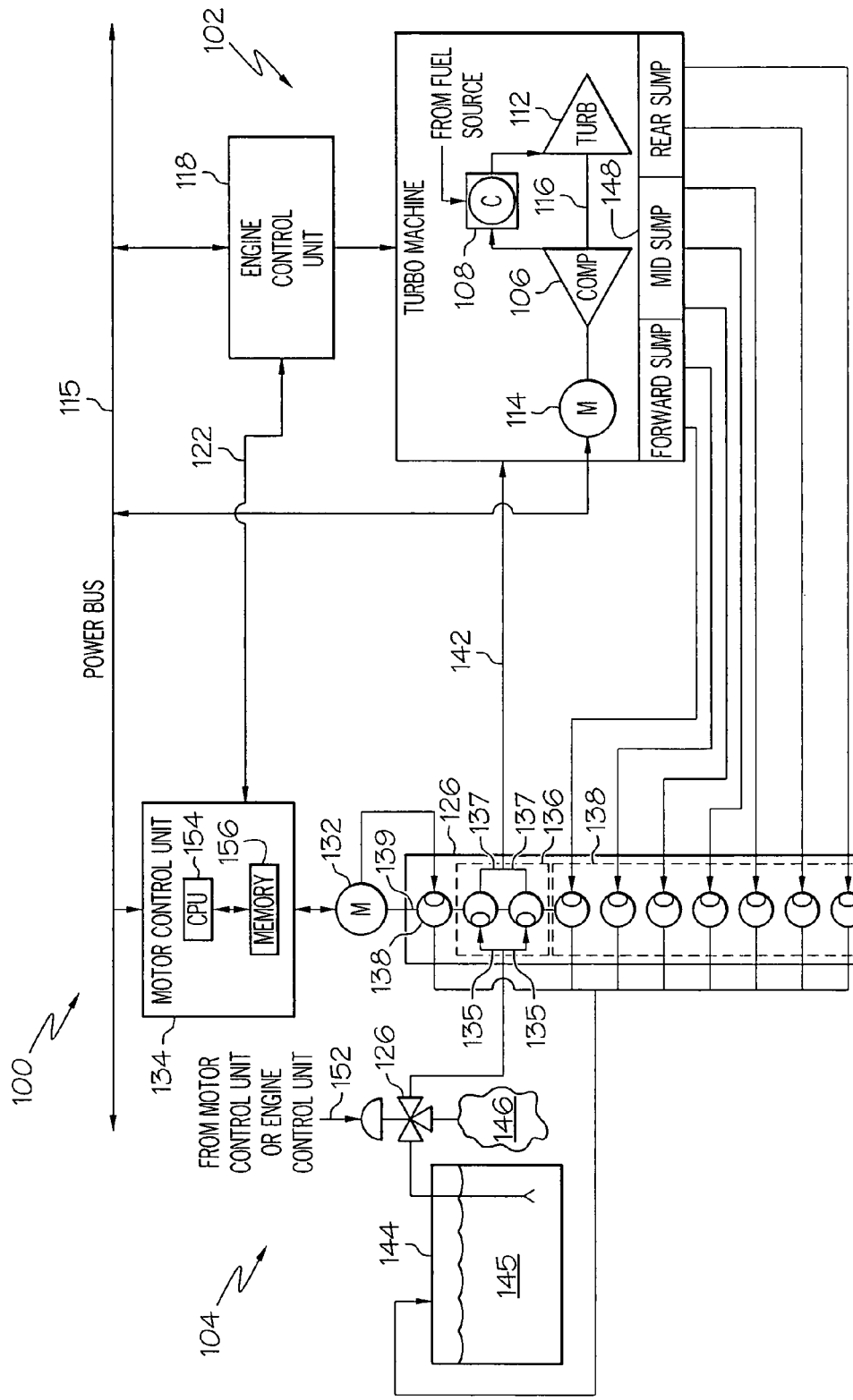
FIG. 1, which is the sole FIGURE, is a schematic diagram of an aircraft lubrication supply system according to an exemplary embodiment of the present invention.

The following detailed description is merely exemplary in nature and is not intended to limit the invention or its application and uses. Furthermore, there is no intention to be bound by any theory presented in the preceding background or the following detailed description. In this regard, although the system is depicted and described as supplying lubricant to a turbomachine, it will be appreciated that the invention is not so limited, and that the system and method described herein may be used to supply lubricant to any one of numerous airframe mounted rotating machines.

With reference now to FIG. 1, a schematic diagram of an exemplary aircraft turbomachine system 100 is depicted, and includes a turbomachine 102 and a lubrication supply system 104. The turbomachine 102 includes a compressor 106, a combustor 108, a turbine 112, and an engine control unit 118. During operation of the turbomachine 102, the compressor 106 draws in ambient air, compresses the ambient air, and supplies a portion of the compressed air to the combustor 108. The combustor 108 receives the compressed air from the compressor 106, and also receives a flow of fuel from a non-illustrated fuel source. The fuel and compressed air are mixed within the combustor 108, and are ignited to produce relatively high-energy combustion gas, which is supplied to the turbine 112.

As the high-energy combustion gas expands through the turbine 112, it impinges on non-illustrated turbine blades, which causes the turbine 112 to rotate. The turbine 112 includes an output shaft 116 that drives the compressor 106. Moreover, as will now be discussed, depending on the mode in which the turbomachine is operating, the turbine 112, via the output shaft 116, may also drive the starter-generator 114, or alternatively the turbine 112 may be driven by the starter-generator 114.

The starter-generator 114 is configured to be selectively operated in either a motor mode or a generator mode. In the motor mode, the starter-generator 114 receives electrical power from an electrical power source, such as a power bus 115, which causes the starter-generator 114 to rotate and supply mechanical output power to, for example, the turbine 112 and compressor 106. In the generator mode, the starter-generator 114 receives mechanical input power from, for example, the turbine 112 and generates electrical power, which is supplied to, for example, the power bus 115.

It will thus be appreciated that the starter-generator 114, when operating in the motor mode, may be used to start the turbomachine 102 and, when operating in the generator mode, may be used to supply electrical power. It will additionally be appreciated that the starter-generator 114 may be configured to implement any one of numerous types of motor/generators including, for example, permanent magnet, induction, and switched reluctance type motor/generators. In a particular physical implementation, however, it is implemented as a high reactance permanent magnet starter-generator.

The engine control unit 118 controls and regulates the operation of the turbomachine 102. In particular, the engine control unit 118 controls and regulates the supply of fuel to the combustor 108, and the mechanical and electrical power output of the starter-generator 114 in the motor mode and generator mode, respectively. It will be appreciated that the engine control unit 118 may implement any one of numerous known engine control laws, and any one of numerous known motor and generator control laws, and may be physically implemented using any one of numerous known circuit configurations for implementing the respective control laws. No matter its particular physical implementation or the particular control laws it implements, the engine control unit 118 is also in operable communication with, and is configured to selectively communicate with, various other systems. For example, at least in the depicted embodiment, the engine control unit 118 is configured to selectively supply one or more signals, referred to herein as engine shutdown signals 122, to the lubrication supply system 104 indicating that the turbomachine 102 is implementing a shutdown sequence. More specifically, the engine control unit 118, upon initiation of the shutdown sequence for the turbomachine 102, generates and supplies the engine shutdown signal 122 to the lubrication supply system 104.

The lubrication supply system 104 includes a pump assembly 124, a control valve 126, a motor 132, and a motor control unit 134. The pump assembly 124, at least in n the depicted embodiment, includes a plurality of supply pumps 136 and a plurality of return pumps 138. The supply pumps 136 each include a fluid inlet 135 and a fluid outlet 137. The supply pumps 136, when driven, draw fluid from one of two fluid sources, and discharge the fluid, at an increased pressure, into a fluid supply conduit 142. The fluid supply conduit 142, among other potential functions, supplies the fluid to the turbomachine 102. It will be appreciated that each of the pumps 136, 138 that comprise the pump assembly 124 could be implemented as any one of numerous types of centrifugal or positive displacement type pumps, but in the preferred embodiment each pump 136, 138 is implemented as a positive displacement pump.

The two fluid sources from which the supply pumps 136 may draw fluid include a lubrication fluid source 144 and a gaseous fluid source 146. The lubrication fluid source 144 may be configured as any one of numerous sources of lubrication fluid, but in the depicted embodiment it is configured a reservoir 144 that stores a supply of lubricant 145 such as, for example, oil or other suitable hydraulic fluid. The gaseous fluid source 146 may be configured as any one of numerous sources of gaseous fluid, but in the depicted embodiment it is configured as an air source. Preferably, the surrounding environment acts as a suitable air source. If not, however, a dedicated source of a suitable gas may be used. No matter the specific configurations of the fluid and gaseous sources, 144, 146, the specific source from whence the supply pumps 136 draw fluid is controlled by the control valve 126.

The control valve 126 is coupled to each of the supply pump inlets 135, and is moveable between at least a first position and a second position. In the first position the control valve 126 fluidly communicates the supply pump fluid inlets with the lubrication fluid source 144, and in the second position the control valve 126 fluidly communicates the supply pump fluid inlets 135 with the gaseous fluid source 146. Thus, when the control valve 126 is in the first position the supply pumps 136 supply lubricant to the turbomachine 102, and when the control valve is in the second position the supply pumps 136 supply air (or other gas) to the turbomachine 102. The control valve 126 is moved between the first and second positions in response to one or more valve control signals 152. It will be appreciated, as indicated in FIG. 1, that the source of the valve control signals 152 may vary and, depending on the particular embodiment, may be supplied from either the engine control unit 118 or the motor control unit 134. It will additionally be appreciated that the control valve 126 may be implemented using any one of numerous types of valves to carry out its functionality. In the depicted embodiment, however, the control valve 126 is implemented as a solenoid-operated, three-way valve.

No matter the specific implementation of the control valve 126, when it is positioned such that lubricant is supplied to the turbomachine 102, the lubricant flows to various components within the turbomachine 102 and is collected in one or more sumps 148. The lubricant that is collected in the sumps 148 is then returned to the lubrication fluid source 144 for reuse. Conversely, when the control valve 126 is positioned such that air is supplied to the turbomachine 102, the air displaces the lubricant within the turbomachine 102, including the lubricant in the sumps 148. The displaced lubricant is similarly returned to the lubrication fluid source 144 for reuse. In both cases, a plurality of the return pumps 138 draws the lubricant from the sumps 148 and discharges the lubricant into the lubrication fluid source 144 for reuse.

Before proceeding further it will be appreciated that the configuration of the pump assembly 124 described herein is merely exemplary, and that the pump assembly 124 could be implemented using any one of numerous other configurations. For example, the pump assembly 124 could be implemented with a single supply pump 136 and a single return pump 138, or with just one or more supply pumps 136. No matter how many supply or return pumps 136, 138 are used to implement the pump assembly 124, it is seen that each pump 136, 138 is mounted on a common pump assembly shaft 139 and is driven via a drive force supplied from the motor 132.

The motor 132 is selectively energized from the power bus 115 and, when energized, rotates at a speed controlled by the motor control unit 134 to thereby supply the drive force to the pump assembly 124. In the depicted embodiment the motor 132 is directly coupled to the pump shaft 139 and thus rotates the pump shaft 139 (and thus the pumps 136, 138) at the motor speed. It will be appreciated, however, that the motor 132, if needed or desired, could be coupled to the pump shaft 139 via one or more gear assemblies, which could be configured to either step up or step down the motor speed. It will additionally be appreciated that the motor 132 could be implemented as any one of numerous types of AC or DC motors, but in a particular preferred embodiment the motor 132 is implemented as a brushless DC motor.

As noted above, the motor 132 is selectively energized from the power bus 115 under the control of the motor control unit 134. The motor control unit 134 implements control logic via, for example, a central processing unit 154. The control logic that the motor control unit 134 implements during turbomachine operation differs from the control logic implemented during the turbomachine 102 shutdown sequence. For example, during turbomachine 102 operation the control logic implements a predefined schedule of lubricant supply pressure as a function of various turbomachine 102, lubrication system 104, and aircraft operating conditions. More specifically, the motor control unit 108 receives a signals representative of various ones of these parameters. In response to these signals, the control logic in the motor control unit 108 determines the scheduled lubricant supply pressure based on these parameters, and controls the motor 132 to rotate at least the supply pumps 136 at a speed that will supply lubricant from the lubrication fluid source 144 at the scheduled lubricant supply pressure. Conversely, during the turbomachine 102 shutdown sequence, the control logic controls motor 132 rotational speed in accordance with a schedule that will displace at least a substantial volume of the lubricant in the turbomachine 102 with air from the gaseous fluid source 146.

It is noted that the control logic that the motor control unit 134 implements during turbomachine 102 operations may be any one of numerous control logic implementations now known or developed in the future. As such, it will not be further described herein. However, for completeness, the control logic that the motor control unit 134 implements during turbomachine 102 shutdown sequence will now be described in more detail.

As was noted above, the engine control unit 118, upon initiation of the shutdown sequence for the turbomachine 102, generates and supplies one or more engine shutdown signals 122. The engine shutdown signal 122, as depicted in FIG. 1, is supplied to at least the motor control unit 134. The motor control unit 134, upon receipt of the engine shutdown signals 122, implements engine shutdown control. In one embodiment, the engine shutdown control configures the motor control unit 134 to generate and supply the valve control signal 152 to the control valve 126 that causes the control valve 126 to move to the second position. As a result, the control valve 126 fluidly communicates the supply pump inlets 135 with the gaseous fluid source 146, and the supply pumps 136 supply air to the turbomachine 102. It will be appreciated that in an alternative embodiment, the valve control signal 152 may be supplied from the engine control unit 118 and may the same signal as the engine shutdown signal 122 or a separate signal generated and supply by the engine control unit 118.

The engine shutdown control implemented by the motor control unit 134 results in pump rotational speed to be controlled in accordance with a selected schedule that will displace at least a substantial volume of lubricant in the turbomachine 102 with air. It is noted that during the turbomachine shutdown sequence, the starter-generator 114 will continue generating and supplying electrical power to the power bus 115. It will be appreciated that as the rotational speed of the turbomachine decreases (or decays) during the shutdown sequence, the voltage magnitude of the electrical power generated and supplied by the starter-generator 114, and thus the voltage magnitude of the power bus 115, will concomitantly decay. Hence, the motor control unit 134 is preferably further configured to determine the power bus voltage magnitude and power bus voltage magnitude decay rate, and the selected schedule is preferably based in part on the determined power bus voltage magnitude and decay rate. The selected schedule, which may be selected from a plurality of schedules stored in a memory 156, may thus vary during the engine shutdown sequence. Preferably, the selected schedule (or schedules) establishes a motor and pump rotational speed that will ensure adequate removal of lubricant from the turbomachine 102 for the determined power bus voltage and decay rate.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An aircraft lubrication supply system, comprising:
a motor coupled to be selectively energized from a power bus and operable, upon being energized, to rotate at a rotational speed and supply a drive force;
a pump having at least a fluid inlet and a fluid outlet, the pump coupled to receive the drive force from the motor and configured, in response thereto, to draw fluid from a fluid source into the fluid inlet and supply the fluid, via the fluid outlet, to a rotating machine;
a control valve coupled to the fluid inlet, the control valve movable between at least a first position, in which the control valve fluidly communicates the fluid inlet with a lubrication fluid source, and a second position, in which the control valve fluidly communicates the fluid inlet with a gaseous fluid source; and
a motor control unit configured to couple to the power bus and to receive a machine shutdown signal, the machine shutdown signal indicating that the rotating machine is being shutdown, the motor control unit operable, upon receipt of the machine shutdown signal, to controllably energize the motor from the power bus to thereby control its rotational speed in accordance with a schedule that will displace at least a substantial volume of lubricant in the rotating machine with fluid from the gaseous fluid source.

2. The system of claim 1, wherein:
the power bus is energized with a voltage magnitude; and
the motor control unit is further operable to determine the power bus voltage magnitude and, upon receipt of the machine shutdown signal, to controllably energize the motor from the power bus based in part on the determined power bus voltage magnitude.

3. The system of claim 2, wherein the motor control unit is further operable to determine a decay rate of the power bus voltage magnitude and, upon receipt of the machine shutdown signal, to controllably energize the motor from the power bus based in part on the determined power bus voltage magnitude decay rate.

4. The system of claim 1, wherein the control valve is coupled to receive one or more valve control signals and is operable, in response thereto, to move to either the first or the second position.

5. The system of claim 4, wherein the one or more valve control signals are supplied from the motor control unit.

6. The system of claim 5, wherein the motor control unit is further operable, in response to the machine shutdown signal, to supply a valve control signal that causes the control valve to move to the second position.

7. The system of claim 4, wherein the one or more valve control signals includes the machine shutdown signal.

8. The system of claim 7, wherein the control valve is operable, in response to the machine shutdown signal, to move to the second position.

9. The system of claim 1, wherein:
the power bus is a DC power bus; and
the motor is a brushless DC motor.

10. A system, comprising:
a motor coupled to be selectively energized from a power bus and operable, upon being energized, to rotate at a rotational speed and supply a drive force;
a pump having at least a fluid inlet and a fluid outlet, the pump coupled to receive the drive force from the motor and configured, in response thereto, to draw fluid from a fluid source into the fluid inlet and supply the fluid, via the fluid outlet, to a rotating machine;
a lubrication fluid source;
an air source;
a control valve coupled between the fluid inlet, the lubrication fluid source, and the air source, the control valve movable between at least a first position, in which the control valve fluidly communicates the fluid inlet with the lubrication fluid source, and a second position, in which the control valve fluidly communicates the fluid inlet with the air source; and
a motor control unit configured to couple to the power bus and to receive a machine shutdown signal, the machine shutdown signal indicating that the rotating machine is being shutdown, the motor control unit operable, upon receipt of the machine shutdown signal, to controllably energize the motor from the power bus to thereby control its rotational speed in accordance with a schedule that will displace at least a substantial volume of lubricant in the rotating machine with fluid from the air source.

11. The system of claim 10, wherein:
the rotating machine comprises a turbomachine that is operable to at least selectively supply electrical power to the power bus at a voltage magnitude; and
the motor control unit is further operable to determine the power bus voltage magnitude and, upon receipt of the machine shutdown signal, to controllably energize the motor from the power bus based in part on the determined power bus voltage magnitude.

12. The system of claim 11, wherein the motor control unit is further operable to determine a decay rate of the power bus voltage magnitude and, upon receipt of the machine shutdown signal, to controllably energize the motor from the power bus based in part on the determined power bus voltage magnitude decay rate.

13. The system of claim 10, wherein the control valve is coupled to receive one or more valve control signals and is operable, in response thereto, to move to either the first or the second position.

14. The system of claim 13, wherein the one or more valve control signals are supplied from the motor control unit.

15. The system of claim 14, wherein the motor control unit is further operable, in response to the machine shutdown signal, to supply a valve control signal that causes the control valve to move to the second position.

16. The system of claim 10, the rotating machine comprises a turbomachine, and wherein the system further comprises:
an engine control unit operable to control turbomachine operations and selectively supply the machine shutdown signal.

17. The system of claim 16, wherein the control valve is operable, in response to the machine shutdown signal, to move to the second position.

18. The system of claim 10, wherein:
the power bus is a DC power bus; and
the motor is a brushless DC motor.

19. A system, comprising:
a turbomachine operable to at least selectively supply electrical power to a power bus at a voltage magnitude;
a motor coupled to be selectively energized from the power bus and operable, upon being energized, to rotate at a rotational speed and supply a drive force;
a pump having at least a fluid inlet and a fluid outlet, the pump coupled to receive the drive force from the motor and configured, in response thereto, to draw fluid from a fluid source into the fluid inlet and supply the fluid, via the fluid outlet, to a rotating machine;
a lubrication fluid source;
an air source;
a control valve coupled between the fluid inlet, the lubrication fluid source, and the air source, the control valve movable between at least a first position, in which the control valve fluidly communicates the fluid inlet with the lubrication fluid source, and a second position, in which the control valve fluidly communicates the fluid inlet with the air source; and
a motor control unit configured to couple to the power bus and to receive a machine shutdown signal, the machine shutdown signal indicating that the rotating machine is being shutdown, the motor control unit operable to determine the power bus voltage magnitude and, upon receipt of the machine shutdown signal, to controllably energize the motor from the power bus based in part on the determined power bus voltage magnitude to thereby control its rotational speed in accordance with a schedule that will displace at least a substantial volume of lubricant in the turbomachine with fluid from the air source.

* * * * *